J. W. Kingman.
Cow Milker.
No. 25,019.  Patented Aug. 9, 1859.

UNITED STATES PATENT OFFICE.

JOHN W. KINGMAN, OF DOVER, NEW HAMPSHIRE.

IMPROVEMENT IN MACHINES FOR MILKING COWS.

Specification forming part of Letters Patent No. 25,019, dated August 9, 1859.

*To all whom it may concern:*

Be it known that I, JOHN W. KINGMAN, of Dover, in the county of Strafford and State of New Hampshire, have invented a new and useful Machine or Apparatus for Milking Cows and other Animals; and I do hereby declare that the same is described and represented in the following specification and drawings, in which—

Figure 1:
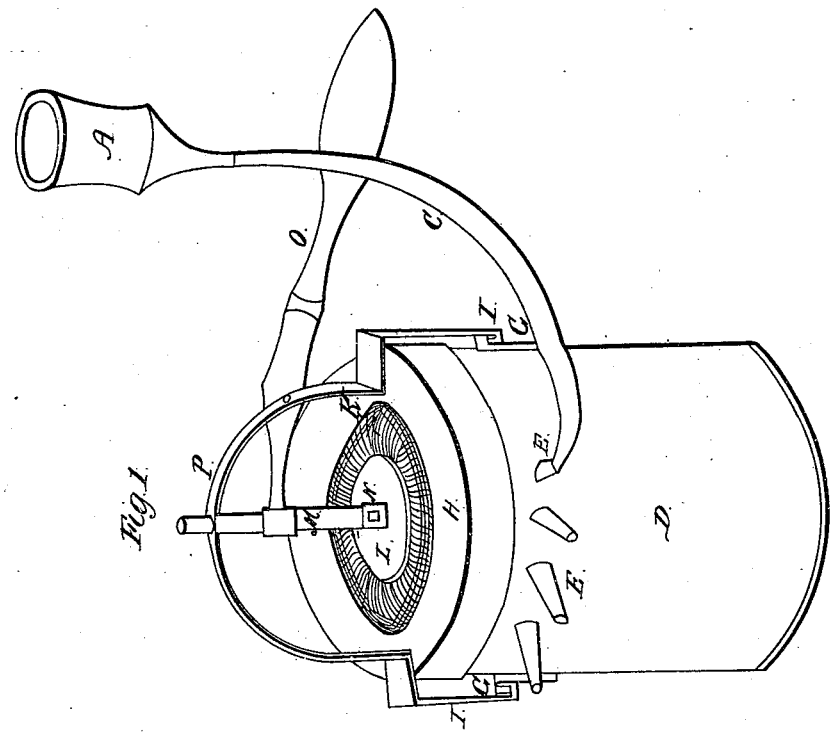
Figure 2:
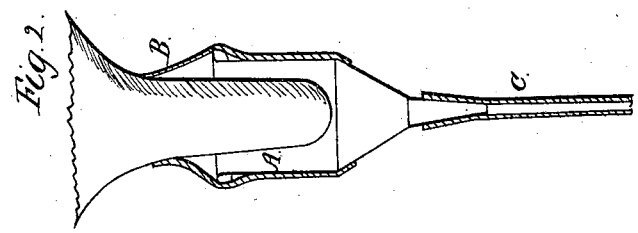

Figure 1 is a perspective view of the apparatus, and Fig. 2 a section of one of the tubes applied to the teat of a cow.

The nature of my invention or apparatus for milking cows or other animals consists in partially covering the upper ends of the teat cups or tubes with an elastic flange, which will yield for the insertion of the teat, and after it is inserted will contract and grip the teat so as to hold the cup upon it during the process of milking, and at the same time form a packing from the edge of the cup to the teat and around it, which will be pressed against the teat by the air outside when the air is exhausted from the inside in the process of drawing the milk from the teat; also, in connecting said teat-cups by means of flexible tubes to a vessel provided with an air-pump so arranged as to draw the air from said vessel and exhaust it, so as to draw the milk from the teats of the cow or other animal to which the teat-cups are applied.

To enable others skilled in the art to make and use my invention, I will proceed to describe its construction and the mode of using it, referring to the accompanying drawings, in which the same letters of reference indicate like parts in each of the drawings or figures.

A is a teat cup or tube, which may be made in the form shown in the drawings or in such other form as will answer the purpose. I have made these cups of sheet-tin, but they may be made of some other substances and answer a good purpose. These cups should be made large enough to slip onto the teats of the animal to be milked freely and large enough to reach nearly or quite to where the teat joins the bag or udder. The tops of these cups are provided with an india-rubber flange B, extending inward and upward, so as to receive the teat and grip or clasp it so firmly as to hold the cup onto the teat during the process of milking. As the cup hangs down on the india-rubber flange, the inner edge of the flange is higher than the top of the cup, and as the cup is exhausted in drawing the milk the air on the outside of the flange presses the flange against the teat, and at the same time the rubber contracts from its own elasticity and so maintains a joint nearly air-tight, or if the teats are wet with water before the cups are applied quite air-tight during the process of milking. The flanges of these teat-cups may be formed by a tubular piece of india-rubber applied to the outside of the cup and the end of the india-rubber made to project above the cup, as shown at B, Fig. 2. The lower part of the cup A is made conical, terminating in a tapering tube, to which the flexible tube C is applied and fastened to connect the cup A to the pail D, which is to receive the milk, the lower end of the flexible tube being fastened to one of the small tubes E E, which project from the side of the pail for that purpose.

The pail D may be made of sheet-tin or other material and provided with four tubes E E near the top, to which the flexible tubes C, before mentioned, are fastened. It is also provided with brackets G G to hold the top H on, which top is provided with a score on the under side filled with india-rubber, so as to make a tight joint by applying the top to the pail and turning it so as to carry the hooks I I under the brackets G G, which are made inclined, so as to draw the top down tight as it is turned. The under side of the top is made convex and has a hole in the center with a valve on the top to close it.

K is a flexible diaphragm, having its edges firmly fastened to the top and its center fastened to the disk L and rod M, which is bored at its lower end and provided with a valve at N, so that when it is worked by the lever O it works the diaphragm K and pumps the air out of the pail and flexible tubes and draws the milk from the animal to which it is applied. The lever O works on a pin in the bail P, fastened to the top H, the ends of which bail form the hooks L L. The bail P is perforated, so that the rod M works through it, as shown in the drawings.

Having described my invention, I claim—

1. The teat cups or tubes partially covered at their upper ends with an elastic flange, substantially as described, which will yield for the insertion of the teat and grip it so as to hold the cup upon the teat during the process of milking, and form a packing between the edge of the cup and the teat, which will be pressed against the teat by the external air when the internal air is exhausted.

2. In combination with the devices above claimed, a vessel provided with an air-pump and connected with said cup or cups by flexible tubes, so arranged as to exhaust the air and draw the milk from the cow or other animal, substantially in the manner described.

JOHN W. KINGMAN.

Witnesses:
JOSIAH L. ROLLINS,
ELIZA A. ROLLINS.